UNITED STATES PATENT OFFICE.

ASA P. MEYLERT, OF NEW BRITAIN, CONNECTICUT.

IMPROVEMENT IN METHODS OF PURIFYING CARBONIC-ACID GAS.

Specification forming part of Letters Patent No. 135,001, dated January 21, 1873.

*To all whom it may concern:*

Be it known that I, ASA P. MEYLERT, of New Britain, in the State of Connecticut, have invented a new and Improved Method for the Purification of Carbonic-Acid Gas; and I do hereby declare the following to be a full, clear, and exact description thereof.

Carbonic-acid gas, when obtained from the combustion of coal or coke, or other fuel, is usually purified by washing the gases with water. This must, however, be used in large quantities in order to remove ordinary impurities, thus conveying away much of the carbonic acid in solution, and at best leaving impurities sufficient to render the gas unfit for use in the manufacture of fine carbonates — as for example, in the manufacture of white lead.

I have discovered that a jet of steam admitted into contact with the gaseous products of combustion purifies these products more perfectly and more economically than the washing of the same with water. I have likewise discovered that the alkaline and earthy carbonates, and particularly the bicarbonate of soda effects the purification of the carbonic gas which is present in the gaseous products of combustion by removing impurities which are usually present, and which are also injurious in the application of these gaseous products of combustion to the manufacture of white lead and of other carbonates.

The nature of my invention consists in diffusing steam with the gaseous products of combustion, and also bringing them in contact with an alkaline or earthy carbonate in order to effect a purification of the carbonic-acid gas contained in such products of combustion.

My mode of operation is as follows: The gaseous products of combustion are exhausted or forced by a pump or blower through a pipe or reservoir, into which a jet of steam, either live or exhaust, is admitted. They are then passed through or in contact with a solution or mixture of carbonate of soda in water. The apparatus used for this purpose is an ordinary tank or cask closed air-tight, having an entrance and exit pipe for the gases, the former pipe being made to dip beneath the surface of the water which contains the purifying materials in the bottom of the tank, the latter pipe being inserted near the top of the tank to convey away the gases which have been forced through the purifying mixture.

Any other suitable apparatus may, however, be used for this purpose.

While any alkaline or earthy carbonate may be used in solution or suspended in a suitable liquid, or in a wet mass for this purpose, a soluble carbonate obviously possesses advantages over those which are insoluble in water, and of the latter the carbonates of soda are preferable to any others, and the bicarbonate of soda is preferable to all others.

I have also discovered that the ordinary oxides—as soda, for example—may be advantageously used instead of the carbonates. I have found by experience that where the oxide or ordinary carbonate of soda, or any mixture of them, is used the result is the union of a portion of the carbonic-acid gas with this base, and the formation of the bicarbonate of soda, or of other highly-carbonated compounds of soda, which are gradually decomposed by the sulphur compounds contained in the gaseous products of combustion, thus setting free the carbonic-acid gas which was at first absorbed, and which entered into combination with the soda; the final result being the same as regards the purification of the gas as when bicarbonate of soda is introduced at first.

Where steam cannot be readily obtained the carbonic-acid gas may be purified in the ordinary way by washing the products of combustion with water, and then exposing them to the influence of an alkaline or earthy carbonate in the manner as hereinbefore mentioned.

What I claim as my invention, and desire to secure by Letters Patent of the United States, is—

1. The method of purifying carbonic-acid gas by bringing the same in contact with an alkaline or earthy carbonate, substantially as and for the purpose set forth.

2. The method of purifying carbonic-acid gas by diffusing steam therewith, substantially as and for the purpose set forth.

3. The method of purifying carbonic-acid gas by diffusing steam therewith, and then bringing the same in contact with an alkaline or earthy carbonate, substantially as and for the purpose set forth.

ASA P. MEYLERT.

Witnesses:
 WM. A. HAYES, Jr.,
 A. L. HAYES.